United States Patent
Hashimoto et al.

(10) Patent No.: US 10,272,922 B2
(45) Date of Patent: Apr. 30, 2019

(54) DRIVING SUPPORT DEVICE AND DRIVING SUPPORT METHOD

(71) Applicants: HONDA MOTOR CO., LTD., Minato-ku, Tokyo (JP); NATIONAL UNIVERSITY CORPORATION HOKKAIDO UNIVERSITY, Sapporo-Shi, Hokkaido (JP)

(72) Inventors: Toshihiro Hashimoto, Wako (JP); Toshitake Kawai, Wako (JP); Toru Hagiwara, Sapporo (JP)

(73) Assignees: Honda Motor Co., Ltd., Tokyo (JP); National University Corporation Hokkaido University, Hokkaido (JP)

( * ) Notice: Subject to any disclaimer, the term of this patent is extended or adjusted under 35 U.S.C. 154(b) by 0 days.

(21) Appl. No.: 14/276,171

(22) Filed: May 13, 2014

(65) Prior Publication Data

US 2014/0343799 A1 Nov. 20, 2014

(30) Foreign Application Priority Data

May 15, 2013 (JP) .................................. 2013-103402

(51) Int. Cl.
*B60W 30/12* (2006.01)
*B60W 30/09* (2012.01)
(Continued)

(52) U.S. Cl.
CPC ............. *B60W 40/09* (2013.01); *B60Q 9/008* (2013.01); *B60W 10/18* (2013.01);
(Continued)

(58) Field of Classification Search
CPC .... B60W 40/09; B60W 10/18; B60W 10/184; B60W 10/20; B60W 2050/143;
(Continued)

(56) References Cited

U.S. PATENT DOCUMENTS

| 2011/0050407 A1* | 3/2011 | Schoenfeld ........ A61B 10/0051 340/426.11 |
| 2012/0109462 A1* | 5/2012 | Hong .............................. 701/41 |
| 2012/0265977 A1* | 10/2012 | Ewell, Jr. .............. G06F 1/1626 713/100 |

FOREIGN PATENT DOCUMENTS

| DE | 10039795 A1 | 3/2002 | |
| JP | 2007-140978 A * | 11/2005 | ............... G08G 1/16 |
| JP | 4972913 B2 | 7/2012 | |

OTHER PUBLICATIONS

Office Action dated Nov. 16, 2016 for corresponding German Patent Application No. 10 2014 209 238.8 and English translation.

(Continued)

*Primary Examiner* — Charles J Han
(74) *Attorney, Agent, or Firm* — Carrier Blackman & Associates, P.C.; Joseph P. Carrier; Anne G. Sabourin

(57) ABSTRACT

A driving support device includes a cross direction control device and a cross direction alarm device which are a first support unit that performs drive support of steering of a vehicle, a traveling direction control device and a traveling direction alarm device which are a second support unit that performs drive support of deceleration of the vehicle, and a running support processing device that controls the first support unit and the second support unit. The running support processing device detects looking-aside of a driver, detects a non-drive manual operation of the driver, and sets a level of an effect of detection of the non-drive manual operation to an effect of detection of the looking-aside in the first support unit to be greater than a level of an effect of detection of the non-drive manual operation to an effect of detection of the looking-aside in the second support unit.

7 Claims, 3 Drawing Sheets

(51) Int. Cl.
| | |
|---|---|
| *B60W 10/184* | (2012.01) |
| *B60W 50/14* | (2012.01) |
| *B60Q 9/00* | (2006.01) |
| *B60W 40/09* | (2012.01) |
| *B60W 10/18* | (2012.01) |
| *B60W 10/20* | (2006.01) |

(52) U.S. Cl.
CPC .......... *B60W 10/184* (2013.01); *B60W 10/20* (2013.01); *B60W 30/09* (2013.01); *B60W 30/12* (2013.01); *B60W 50/14* (2013.01); *B60W 2050/143* (2013.01)

(58) Field of Classification Search
CPC ...... B60W 30/09; B60W 30/12; B60W 50/01; G08G 1/16; B60Q 9/008
See application file for complete search history.

(56) References Cited

OTHER PUBLICATIONS

Search Report dated Nov. 16, 2016 for corresponding German Patent Application No. 10 2014 209 238.8 and English translation.

* cited by examiner

DRIVING SUPPORT DEVICE AND DRIVING SUPPORT METHOD

BACKGROUND

Technical Field

The present invention relates to a driving support device and a driving support method which support driving of a vehicle, in particular to a driving support device and a driving support method which support safety of a vehicle when a driver looks aside while driving.

Related Art

There is a running support device which, when a risk of collision of a vehicle occurs, notifies of the risk or performs running control to avoid the risk in order to prevent the collision of the vehicle.

As a device that performs such running support, a device is known which increases gain of a driving support device and/or changes timing to give an alarm to a driver when detecting looking-aside of the driver of a vehicle and detecting that the looking-aside is performed along with a manual operation (see Japanese Patent No. 4972913).

SUMMARY

However, it is known that a physical load (physical demand) such as, for example, searching for a thing without seeing the thing, which is an operation other than a visual operation (looking-aside), also negatively affects the driving. In conventional techniques, there is a problem that it is not possible to deal with an operation without seeing and a risk caused by the operation.

A driving support device of the present invention includes a first support unit that performs drive support of steering of a vehicle, a second support unit that performs drive support of deceleration of the vehicle, and a running support processing device that controls the first support unit and the second support unit. The running support processing device detects looking-aside of a driver and detects a non-drive manual operation which is a driver's manual operation other than a driving operation. The running support processing device sets a level of an effect of detection of the non-drive manual operation to an effect of detection of the looking-aside in the first support unit to be greater than a level of an effect of detection of the non-drive manual operation to an effect of detection of the looking-aside in the second support unit on the basis of a detection result of the looking-aside and a detection result of the non-drive manual operation.

According to one aspect of the present invention, the running support processing device sets a level of an effect of the detection of the non-drive manual operation to be greater than a level of an effect of the first support unit and the second support unit of the detection of the looking-aside in the first support unit and the second support unit.

According to still another aspect of the present invention, the first support unit is a steering control unit configured to control at least either one of an operation to maintain the vehicle to run within a lane and an operation to prevent the vehicle from departing from the lane, the second support unit is a brake control unit configured to avoid collision with an object in front of the vehicle, and the running support processing device changes timing of steering control of the steering control unit and timing of brake control of the brake control unit on the basis of the detection result of the looking-aside and the detection result of the non-drive manual operation.

According to still another aspect of the present invention, the first support unit is a side alarm unit configured to output an alarm when it is predicted that the vehicle will depart from a lane, the second support unit is a front alarm unit configured to output an alarm when a collision with an object in front of the vehicle is predicted, and the running support processing device changes timing of a side alarm of the side alarm unit and timing of a front alarm of the front alarm unit on the basis of the detection result of the looking-aside and the detection result of the non-drive manual operation.

According to still another aspect of the present invention, the driving support device further includes a camera configured to pick up an image of the driver, wherein the running support processing device detects at least either one of the looking-aside and the non-drive manual operation based on an image from the camera.

Further, the present invention provides a driving support method that controls a first support unit configured to perform drive support of steering of a vehicle and a second support unit configured to perform drive support of deceleration of the vehicle, the driving support method detects looking-aside of a driver and a non-drive manual operation which is a driver's manual operation other than a driving operation, and sets a level of an effect of detection of the non-drive manual operation to an effect of detection of the looking-aside in the first support unit to be greater than a level of an effect of detection of the non-drive manual operation to an effect of detection of the looking-aside in the second support unit on the basis of a detection result of the looking-aside and a detection result of the non-drive manual operation.

According to the present invention, it is possible to perform appropriate support control in each of the vehicle traveling direction and the vehicle cross direction on the basis of the knowledge that the looking-aside and the non-drive manual operation of the driver have different effects on each of the vehicle traveling direction and the vehicle cross direction.

DETAILED DESCRIPTION

Hereinafter, an embodiment of the present invention will be described with reference to the drawings.

Figure 1:
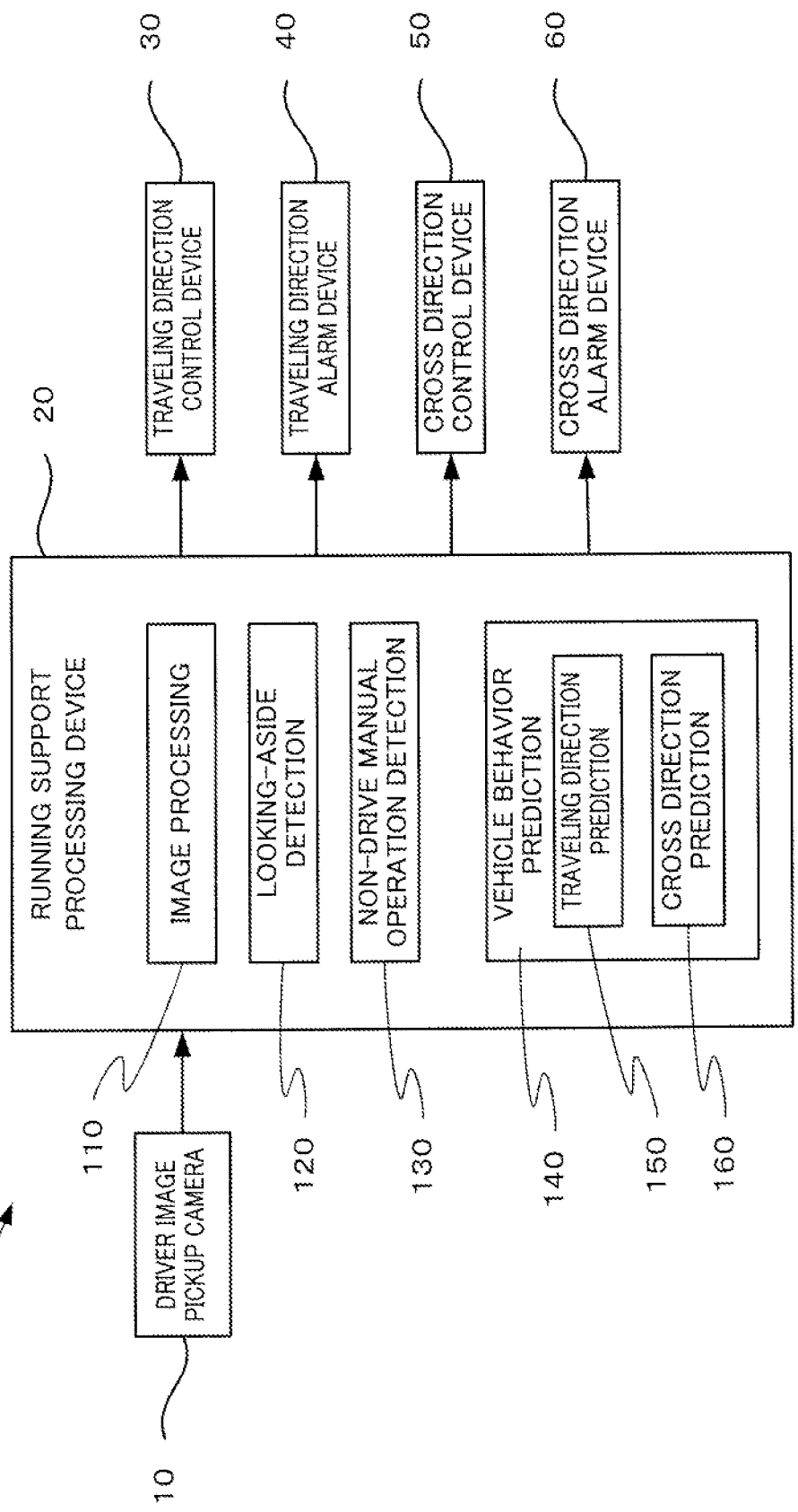
FIG. 1 is a block diagram showing a configuration of a driving support device according to an embodiment of the present invention.

FIG. 1 is a block diagram showing a configuration of a driving support device according to the embodiment of the present invention.

The driving support device 1 includes a driver image pickup camera 10, a running support processing device 20, a traveling direction control device 30, a traveling direction alarm device 40, a cross direction control device 50, and a cross direction alarm device 60.

The driver image pickup camera 10 is a camera installed in a vehicle. The driver image pickup camera 10 picks up images of a driver in a range and a resolution in which driver's action and situation such as movements of the driver's head, face, eyes, and hands can be known.

The traveling direction control device 30 or the traveling direction alarm device 40 is a second support unit that performs drive support of deceleration of the vehicle.

The traveling direction control device 30 is a device that controls the traveling direction, that is, the front-back direction, of the vehicle.

The present embodiment employs a CMBS (Collision Mitigation Brake System) which is a brake control unit that avoids collision with an object in front of the vehicle. The CMBS monitors a vehicle ahead by using radar. When a risk of rear-end collision occurs, the CMBS notifies the driver of the risk by an alarm sound, tightening seatbelt, and/or display in a panel provided on the driver's side. If the CMBS determines that the collision cannot be avoided, the CMBS performs brake control.

The traveling direction alarm device 40 is a device that outputs an alarm related to the traveling direction of the vehicle to the driver.

The present embodiment employs an FCW (Forward Collision Warning) which is a front alarm unit that outputs an alarm when a collision with an object in front of the vehicle is predicted. For example, while the vehicle is running at a vehicle speed of about 15 km/h or faster, if the vehicle comes close to a vehicle in front of the vehicle, the FCW calls a driver's attention by a display and/or a sound.

The cross direction control device 50 or the cross direction alarm device 60 is a first support unit that performs drive support of steering of the vehicle.

The cross direction control device 50 is a device that controls the cross direction, that is, the left-right direction, of the vehicle.

The present embodiment employs an LKAS (Lane Keep Assistant System) which is a steering control unit that controls the vehicle to maintain running within a lane or controls the vehicle to be prevented from departing from the lane. The LKAS is a function to support the driver to drive within the traffic lane by steering control. The LKAS recognizes the traffic lane and performs the steering control such as causing an electric power steering (EPS) to generate appropriate torque, so that LKAS assists lane keeping. Thereby, it is possible to perform lane-keeping running by a light steering operation.

The cross direction alarm device 60 is a device that outputs an alarm related to the cross direction of the vehicle to the driver.

The present embodiment employs an LDW (Lane Departure Warning) which is a side alarm unit that outputs an alarm when it is predicted that the vehicle will depart from the lane. The LDW warns the driver by using a signal of tactile sense such as sound or vibration when the driver will inadvertently depart from the lane.

The running support processing device 20 is a computer including a processor such as a CPU (Central Processing Unit) and memories such as a ROM (Read Only Memory) in which programs are written and a RAM (Random Access Memory) for temporarily storing data.

The running support processing device 20 includes an image processing unit 110, a looking-aside detection unit 120, a non-drive manual operation detection unit 130, and a vehicle behavior prediction unit 140. The vehicle behavior prediction unit 140 includes a traveling direction prediction unit 150 and a cross direction prediction unit 160. The aforementioned units included in the running support processing device 20 are realized by programs executed by the running support processing device 20 which is a computer. The computer programs can be stored in any computer-readable storage medium.

While the aforementioned units included in the running support processing device 20 can be realized by executing programs, each of the units can also be configured as dedicated hardware including one or more electrical components.

Figure 2:
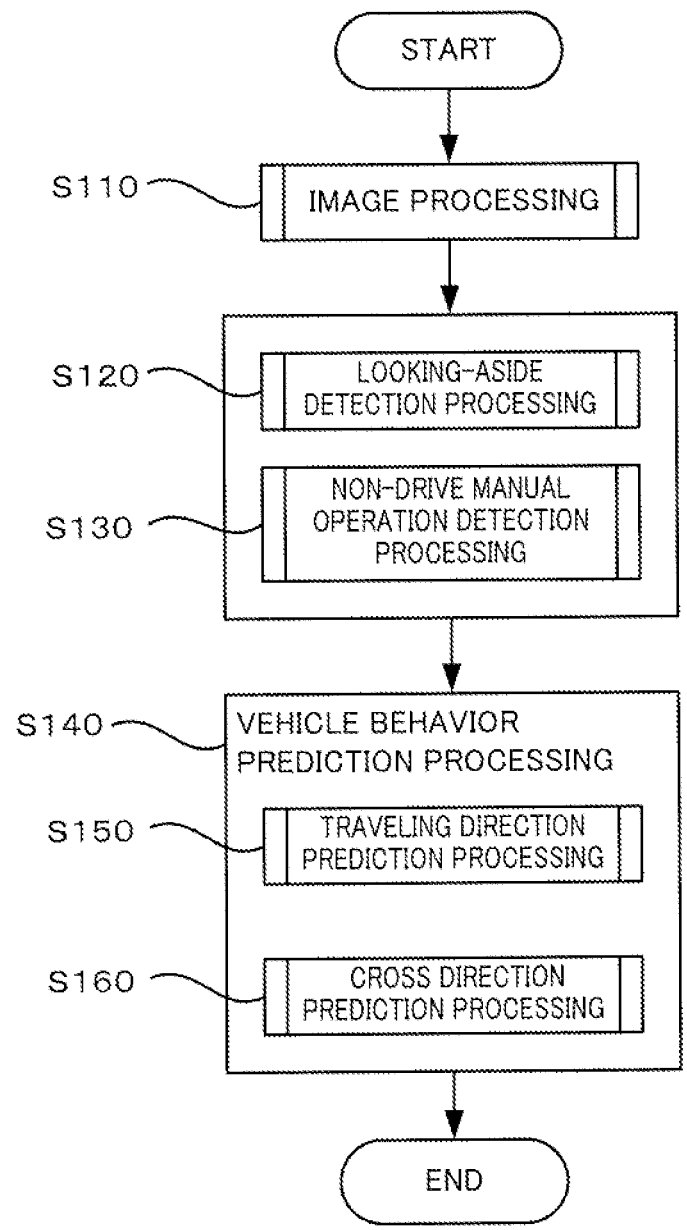
FIG. 2 is a sequence diagram showing a processing procedure of a running support processing device according to the embodiment of the present invention.

Processing performed by the aforementioned units included in the running support processing device 20 will be described with reference to FIG. 2. FIG. 2 is a sequence diagram showing a processing procedure of the running support processing device according to the embodiment of the present invention.

First, the image processing unit 110 performs image processing S110. The image processing unit 110 receives images from the driver image pickup camera 10 and generates information useful for looking-aside detection that detects looking-aside of the driver and information useful for non-drive manual operation detection that detects a driver's manual operation other than the driving operation.

The looking-aside detection unit 120 performs looking-aside detection processing S120. The looking-aside detection unit 120 detects looking-aside of the driver from the information useful for the looking-aside detection from the image processing unit 110.

Figure 3:
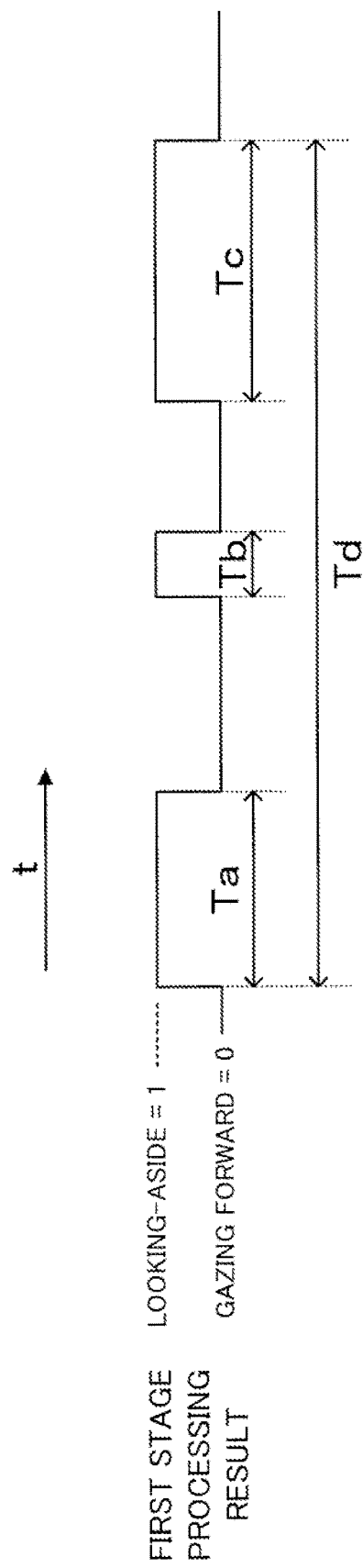
FIG. 3 is a timing chart for explaining looking-aside detection processing according to the embodiment of the present invention.

FIG. 3 is a timing chart for explaining the looking-aside detection processing according to the embodiment of the present invention. The looking-aside detection processing S120 will be described with reference to FIG. 3.

The looking-aside detection unit 120 performs the looking-aside detection processing S120 in two stages.

In the first stage processing, the looking-aside detection unit 120 analyzes the lines of sight of the driver from the information transmitted from the image processing unit 110 and determines whether or not the driver looks aside while driving. Various known methods such as techniques described in JP 06-262959 A and JP 2002-8020 A can be used for the processing. As a result, a case in which it is determined that the driver does not look aside, that is, the driver gazes forward, is defined as 0, and a case in which it is determined that the driver looks aside is defined as 1.

As a result of the first stage processing, a forward gazing state 0 and a looking-aside state 1 are continuously determined along the elapse of time indicated by the arrow t in FIG. 3.

In the second stage processing, the looking-aside detection unit 120 performs the following processing from the result of the first processing:
(1) The looking-aside detection unit 120 calculates a total looking-aside time per unit time. Specifically, the looking-aside detection unit 120 calculates the total looking-aside time per unit time by the time (Ta+Tb+Tc)/Td shown in FIG. 3.
(2) The looking-aside detection unit 120 measures single looking-aside times. Specifically, the single looking-aside times are Ta, Tb, and Tc shown in FIG. 3.
(3) The looking-aside detection unit 120 calculates a looking-aside frequency (the number of times/second).

As a result, if the total looking-aside time per unit time, each of the single looking-aside times, or the looking-aside frequency exceeds their respective threshold values, the looking-aside detection unit 120 determines that the looking-aside is detected.

The looking-aside detection unit 120 outputs the determination result of whether or not the looking-aside is detected, which is the processing result of the second stage, the total looking-aside time per unit time, the single looking-aside times, and the looking-aside frequency to the vehicle behavior prediction unit 140.

In this way, the looking-aside detection unit 120 enables continuous looking-aside determination.

The non-drive manual operation detection unit 130 performs non-drive manual operation detection processing S130. The non-drive manual operation detection unit 130 detects a non-drive manual operation which is a driver's manual operation other than the driving operation from the information useful for detecting a driver's manual operation other than the driving operation from the image processing unit 110.

The non-drive manual operation detection unit 130 performs the non-drive manual operation detection processing S130 in two stages in the same manner as the looking-aside detection unit 120.

In the first stage processing, the non-drive manual operation detection unit 130 analyzes the driver's manual operation from the information transmitted from the image processing unit 110 and determines whether or not the driver performs the non-drive manual operation. Various known methods can be used for the processing. As a result, a case in which it is determined that the driver does not perform the non-drive manual operation, that is, the driver concentrates on driving, is defined as 0, and a case in which it is determined that the driver performs the non-drive manual operation is defined as 1.

As a result of the first stage processing, a concentrating on driving state 0 and a non-drive manual operation state 1 are continuously determined along the elapse of time.

In the second stage processing, the non-drive manual operation detection unit 130 performs the following processing from the result of the first processing:

(1) The non-drive manual operation detection unit 130 calculates a total non-drive manual operation time per unit time. Specifically, this processing is the same as that in the looking-aside detection processing.

(2) The non-drive manual operation detection unit 130 measures single non-drive manual operation times. Specifically, this processing is the same as that in the looking-aside detection processing.

(3) The non-drive manual operation detection unit 130 calculates a non-drive manual operation frequency (the number of times/second).

As a result, if the total non-drive manual operation time per unit time, each of the single non-drive manual operation times, or the non-drive manual operation frequency exceeds their respective threshold values, the non-drive manual operation detection unit 130 determines that the non-drive manual operation is detected.

The non-drive manual operation detection unit 130 outputs the determination result of whether or not the non-drive manual operation is detected, which is the processing result of the second stage, the total non-drive manual operation time per unit time, the single non-drive manual operation times, and the non-drive manual operation frequency to the vehicle behavior prediction unit 140.

In this way, the non-drive manual operation detection unit 130 enables continuous non-drive manual operation determination.

An execution sequence of the looking-aside detection processing S120 and the non-drive manual operation detection processing S130 may be changed.

The vehicle behavior prediction unit 140 performs vehicle behavior prediction processing S140. The vehicle behavior prediction processing S140 includes traveling direction prediction processing S150 and cross direction prediction processing S160. The traveling direction prediction unit 150 performs the traveling direction prediction processing S150. The cross direction prediction unit 160 performs the cross direction prediction processing S160.

The present invention is based on a study of the applicants, which indicates that two actions, that is, the non-drive manual operation and the looking-aside, have different effects on each of (A) variation in the traveling direction and (B) variation in the vehicle cross direction.

For example, this is a prediction model in which the non-drive manual operation contributes to the vehicle traveling direction by N1% and the looking-aside contributes to the vehicle traveling direction by N2% (N2=100−N1). On the other hand, the non-drive manual operation contributes to the vehicle cross direction by N3% and the looking-aside contributes to the vehicle cross direction by N4% (N4=100−N3).

Here, a study result of the applicants, which indicates N3>N1, is obtained. In other words, regarding the non-drive manual operation detection with respect to the looking-aside detection, the effect on the vehicle cross direction is greater than the effect on the vehicle traveling direction.

Therefore, the vehicle behavior prediction unit 140 sets a level of the effect of the non-drive manual operation detection to the effect of the looking-aside detection in the cross direction control device 50 or the cross direction alarm device 60, which performs control in the vehicle cross direction, to be greater than a level of the effect of the non-drive manual operation detection to the effect of the looking-aside detection in the traveling direction control device 30 or the traveling direction alarm device 40, which performs control in the vehicle traveling direction. Thereby, when the non-drive manual operation is detected, it is possible to perform control to be safer in the vehicle cross direction.

Further, a study result of the applicants, which indicates N1>N2 and N3>N4, is obtained. In other words, regarding both the effect on the vehicle traveling direction and the effect on the vehicle cross direction, the effect of the non-drive manual operation detection is greater than the effect of the looking-aside detection.

Therefore, the vehicle behavior prediction unit 140 sets a level of the effect of each support unit, that is the traveling direction control device 30, the traveling direction alarm device 40, the cross direction control device 50, and the cross direction alarm device 60, in the non-drive manual operation detection to be greater than a level of the effect of each support unit in the looking-aside detection. Thereby, it is possible to perform control to be safer in the vehicle traveling direction and the vehicle cross direction.

The vehicle behavior prediction unit 140 introduces a concept of gain to safety in order to perform control to be safer and controls the traveling direction control device 30, the traveling direction alarm device 40, the cross direction control device 50, and the cross direction alarm device 60 in order to cause the vehicle to run more safely by increasing the gain.

The traveling direction prediction unit 150 changes a time (Time To collision: TTC) until the vehicle collides with a vehicle ahead for the traveling direction control device 30 that employs the CMBS in the present embodiment. Specifically, the traveling direction prediction unit 150 increases a threshold value of a collision prediction time by increasing the gain and outputs a control signal to early activate an automatic brake. In this way, the traveling direction prediction unit 150 changes the timing of brake control of the brake control unit to be earlier.

The traveling direction prediction unit 150 changes the TTC for the traveling direction alarm device 40 that employs the FCW in the present embodiment. Specifically, the traveling direction prediction unit 150 increases the threshold value of the collision prediction time by increasing the gain and outputs a control signal to output an alarm early. In this way, the traveling direction prediction unit 150 changes the timing of a front alarm to be earlier.

The cross direction prediction unit 160 changes a time until the vehicle departs from the lane for the cross direction control device 50 that employs the LKAS in the present embodiment. Specifically, the cross direction prediction unit 160 increases a threshold value of a departure prediction time by increasing the gain and outputs a control signal to output a steering torque reaction force early. In this way, the cross direction prediction unit 160 changes the timing of steering control to be earlier.

The cross direction prediction unit 160 changes a prediction time until the vehicle departs from the lane for the cross direction alarm device 60 that employs the LDW in the present embodiment. Specifically, the cross direction prediction unit 160 increases the threshold value of the departure prediction time by increasing the gain and outputs a control signal to output an alarm early. In this way, the cross direction prediction unit 160 changes the timing of a side alarm to be earlier.

In addition to the above, the vehicle behavior prediction unit 140 may change the gain by the length of the total looking-aside time per unit time, the length of the single looking-aside time, the looking-aside frequency, the length of the total non-drive manual operation time per unit time, the length of the single non-drive manual operation time, or the non-drive manual operation frequency.

For example, the longer the total looking-aside time per unit time, the more the vehicle behavior prediction unit 140 changes the gain to a safety side for the vehicle to run. Further, the longer the single looking-aside time, the more the vehicle behavior prediction unit 140 changes the gain to the safety side for the vehicle to run. Further, the higher the looking-aside frequency, the more the vehicle behavior prediction unit 140 changes the gain to the safety side for the vehicle to run.

Further, the longer the total non-drive manual operation time per unit time, the more the vehicle behavior prediction unit 140 changes the gain to the safety side for the vehicle to run. Further, the longer the single non-drive manual operation time, the more the vehicle behavior prediction unit 140 changes the gain to the safety side for the vehicle to run. Further, the higher the non-drive manual operation frequency, the more the vehicle behavior prediction unit 140 changes the gain to the safety side for the vehicle to run.

Although in the present embodiment, an example is described in which the CMBS is employed as the traveling direction control device 30, the traveling direction control device 30 is not limited to the CMBS, but may be another device that controls the traveling direction. The traveling direction prediction unit 150 outputs a control signal indicating a support amount of control intervention and the like to the other device that controls the traveling direction in order to change the device to the safety side for the vehicle to run.

Similarly, although in the present embodiment, an example is described in which the FCW is employed as the traveling direction alarm device 40, the traveling direction alarm device 40 is not limited to the FCW, but may be another alarm device of the traveling direction. The traveling direction prediction unit 150 outputs an alarm signal that changes a threshold value of an alarm or the like to the other alarm device of the traveling direction in order to change the device to the safety side for the vehicle to run.

Similarly, although in the present embodiment, an example is described in which the LKAS is employed as the cross direction control device 50, the cross direction control device 50 is not limited to the LKAS, but may be another device that controls the cross direction. The cross direction prediction unit 160 outputs a control signal indicating a support amount of control intervention and the like to the other device that controls the cross direction in order to change the device to the safety side for the vehicle to run.

Similarly, although in the present embodiment, an example is described in which the LDW is employed as the cross direction alarm device 60, the cross direction alarm device 60 is not limited to the LDW, but may be another alarm device of the cross direction. The cross direction prediction unit 160 outputs an alarm signal that changes a threshold value of an alarm or the like to the other alarm device of the cross direction in order to change the device to the safety side for the vehicle to run.

Although in the present embodiment, images from the driver image pickup camera 10 are used in the looking-aside detection processing S120 and the non-drive manual operation detection processing S130, other information from which an action of the driver can be detected may be used. While processing that uses information of an operation of an apparatus such as a navigational apparatus, an audio apparatus, and an air-conditioning apparatus may be performed, information of an operation of the driver without information of an operation of a passenger is required because the apparatus may be operated by a passenger. When images of the driver picked up by the driver image pickup camera 10 in a range and a resolution in which driver's action and situation can be known are used, there is an effect that the detection accuracy of the looking-aside detection processing S120 and the non-drive manual operation detection processing S130 is improved.

Two or more driver image pickup cameras 10 may be used. In the looking-aside detection processing S120 and the non-drive manual operation detection processing S130, when detections are performed by using images from two or more driver image pickup cameras 10, it is possible to perform various detections and improve detection accuracy.

As described above, in the device according to the present embodiment, the running support processing device 20 detects the looking-aside of the driver (S120), detects the non-drive manual operation which is a driver's manual operation other than the driving operation (S130), and sets the level of the effect of the non-drive manual operation detection to the effect of the looking-aside detection in the cross direction control device 50 or the cross direction alarm device 60, which is the first support unit and performs control in the vehicle cross direction, to be greater than the level of the effect of the non-drive manual operation detection to the effect of the looking-aside detection in the traveling direction control device 30 or the traveling direction alarm device 40, which is the second support unit and performs control in the vehicle traveling direction, on the basis of a detection result of the looking-aside and a detection result of the non-drive manual operation (S140).

In other words, the device according to the present embodiment detects the non-drive manual operation and the looking-aside of the driver and performs drive support of steering and deceleration of the vehicle according to the detection results. The device sets the level of the effect of the non-drive manual operation detection to the effect of the looking-aside detection in the steering support to be greater than the level of the effect of the non-drive manual operation detection to the effect of the looking-aside detection in the deceleration support.

According to the present embodiment, it is possible to perform appropriate support control in each of the vehicle traveling direction and the vehicle cross direction on the basis of the knowledge that the looking-aside and the non-drive manual operation of the driver have different effects on each of the vehicle traveling direction and the vehicle cross direction.

According to the present embodiment, a risk of distraction, in which when a mobile phone or a car navigation system is used while driving, attention required to drive a vehicle is dispersed and safety is degraded, can be broadly divided into the following two risks: (1) a risk in which the driver cannot perform appropriate action in the vehicle traveling direction (collision with a car ahead) and (2) a risk in which the driver cannot perform appropriate action in the vehicle cross direction (departure from a road), and it is possible to control the vehicle to move to the safer side by applying different effects to (1) and (2) according to the type of the distraction (visual operation or non-drive manual operation).

According to the present embodiment, even when an operation other than an operation of an in-vehicle device, for example, an operation of a smartphone or an operation to pick up a thing on the passenger seat, is performed, it is possible to issue an appropriate instruction regarding the vehicle traveling direction and the vehicle cross direction.

According to the present embodiment, it is possible to predict the effect of only the non-drive manual operation (physical load) on the vehicle behavior.

The present embodiment includes a risk prediction algorithm that enables continuous determination instead of discrete determination such as "a navigation system is being operated" included in a conventional technique. Therefore, as a result of highly accurate prediction of the behavior of the vehicle instead of a simple prediction such as "it is dangerous because a navigation system is being operated" and "it is ok because a radio is being operated" which are not so reliable, it is possible to realize driving assistance devices such as the traveling direction control device 30 and the cross direction control device 50 and hazard warning devices such as the traveling direction alarm device 40 and the cross direction alarm device 60, which can cope with the highly accurate prediction.

According to the present embodiment, a behavior prediction of a vehicle in the traveling direction and a behavior prediction of a vehicle in the cross direction can be performed, so that it is possible to issue a command of different gain to each of the traveling direction control device 30 that assists driving in the traveling direction and the cross direction control device 50 that assists driving in the cross direction, which deal with the behavior predictions. Further, it is possible to cause the traveling direction alarm device 40 and the cross direction alarm device 60 to issue an alarm by different gain.

Thereby, it is possible to issue detailed instructions regarding the vehicle traveling direction and the vehicle cross direction.

The embodiment of the present invention is not limited to the embodiment described above, and various modifications can be made without departing from the scope of the present technique.

What is claimed is:

1. A driving support device comprising:
a first support unit to perform drive support of steering of a vehicle;
a second support unit to perform drive support of deceleration of the vehicle; and
a controller to control the first support unit and the second support unit, wherein the controller:
detects looking-aside of a driver;
detects a non-drive manual operation which is a driver's manual operation other than a driving operation;
determines values for the detected looking-aside and non-drive manual operations;
determines a behavior prediction of the vehicle in the traveling direction and a behavior prediction of the vehicle in the cross direction, wherein the behavior predictions are each determined based upon the looking aside and non-drive manual operation values;
controls the first support unit to perform the drive support of steering by changing a gain of the first support unit, according to the looking behavior prediction of the vehicle in the cross direction; and
controls the second support unit to perform the drive support of deceleration by changing a gain of the second support unit according to the behavior prediction of the vehicle in the traveling direction,
wherein, when controlling the first and second support units, the controller sets levels of the drive support of steering and the drive support of deceleration so that the gain of the first support unit with respect to the non-drive manual operation detection is greater than the gain of the second support unit with respect to the non-drive manual operation detection.

2. The driving support device according to claim 1, wherein, when both the looking-aside and the non-drive manual operation are detected, the controller sets the levels of the drive support of steering and the drive support of deceleration so that the gain of the first support unit with respect to the non-drive manual operation detection is greater than the gain of the first support unit with respect to the looking-aside detection, and the gain of the second support unit with respect to the non-drive manual operation detection is greater than the gain of the second support unit with respect to the looking-aside detection.

3. The driving support device according to claim 1, wherein
the first support unit is a steering control unit configured to control at least either one of an operation to maintain the vehicle to run within a lane and an operation to prevent the vehicle from departing from the lane,
the second support unit is a brake control unit configured to avoid collision with an object in front of the vehicle.

4. The driving support device according to claim 1, wherein
the first support unit is a side alarm unit configured to output an alarm when it is predicted that the vehicle will depart from a lane,
the second support unit is a front alarm unit configured to output an alarm when a collision with an object in front of the vehicle is predicted.

5. The driving support device according to claim 1, further comprising:
a camera configured to pick up an image of the driver, wherein the controller detects at least either one of the looking-aside and the non-drive manual operation based on an image from the camera.

6. A driving support method that controls a first support unit configured to perform drive support of steering of a vehicle and a second support unit configured to perform drive support of deceleration of the vehicle, the driving support method comprising the steps of:
 continuously detecting looking-aside of a driver;
 continuously detecting a non-drive manual operation which is a driver's manual operation other than a driving operation;
 determining values for the detected looking-aside and non-drive manual operations;
 determining a behavior prediction of the vehicle in the traveling direction and a behavior prediction of the vehicle in the cross direction, wherein the behavior predictions are each determined based upon the looking aside and non-drive manual operation values;
 controlling the first support unit to perform the drive support of steering by changing a gain of the first support unit, according to the behavior prediction of the vehicle in the cross-direction; and
 controlling the second support unit to perform the drive support of deceleration by changing a gain of the second support unit, according to the behavior prediction of the vehicle in the travelling direction,
 wherein, when controlling the first and second support units, setting levels of the drive support of steering and the drive support of deceleration so that the gain of the first support unit with respect to the non-drive manual operation detection is greater than the gain of the second support unit with respect to the non-drive manual operation detection based on a detection of looking-aside and a detection of non-drive manual operation.

7. A driving support device comprising:
 a first support unit to perform drive support of steering of a vehicle including one of a cross direction control device and a cross direction alarm device to control running within a lane or to prevent departing a lane;
 a second support unit to perform drive support of deceleration of the vehicle including one of a traveling direction control device and a traveling direction alarm device to control a traveling direction forward or backward;
 and a controller to control the first support unit and the second support unit;
 a camera configured to pick up an image of the driver wherein, based on input from the camera the controller continuously, during driving detects:
 i) looking-aside of a driver, and
 ii) non-drive manual operation which is a driver's manual operation other than a driving operation, including operation of non in-vehicle devices;
 and wherein, based on the detection of i) and ii), the controller:
 determines values for the detected looking-aside and non-drive manual operations;
 determines a behavior prediction of the vehicle in the traveling direction and a behavior prediction of the vehicle in the cross direction, wherein the behavior predictions are each determined based upon the looking aside and non-drive manual operation values;
 controls the first support unit to perform the drive support of steering by changing a gain of the first support unit, according to the looking behavior prediction of the vehicle in the cross direction; and
 controls the second support unit to perform the drive support of deceleration by changing a gain of the second support unit according to the behavior prediction of the vehicle in the traveling direction,
 wherein, when controlling the first and second support units, the controller sets levels of the drive support of steering and the drive support of deceleration so that the gain of the first support unit with respect to the non-drive manual operation detection is greater than the gain of the second support unit with respect to the non-drive manual operation detection.

* * * * *